US011950577B2

(12) United States Patent
Simpkinson et al.

(10) Patent No.: US 11,950,577 B2
(45) Date of Patent: Apr. 9, 2024

(54) DEVICES TO ASSIST ECOSYSTEM DEVELOPMENT AND PRESERVATION

(71) Applicant: Vulcan Inc., Seattle, WA (US)

(72) Inventors: Richard Earl Simpkinson, Issaquah, WA (US); Omer Rosenbaum, Kirkland, WA (US); Richard Ignacio Zaragoza, Issaquah, WA (US); Rusty Allen Gerard, Bothell, WA (US); Shamyl Emrich Zakariya, Seattle, WA (US)

(73) Assignee: Vale Group LLC, Seattle, WA (US)

( * ) Notice: Subject to any disclaimer, the term of this patent is extended or adjusted under 35 U.S.C. 154(b) by 548 days.

(21) Appl. No.: 16/782,726

(22) Filed: Feb. 5, 2020

(65) Prior Publication Data

US 2020/0253170 A1 Aug. 13, 2020

Related U.S. Application Data

(60) Provisional application No. 62/837,666, filed on Apr. 23, 2019, provisional application No. 62/822,738, filed on Mar. 22, 2019, provisional application No. 62/803,321, filed on Feb. 8, 2019.

(51) Int. Cl.
*A01K 63/02* (2006.01)

(52) U.S. Cl.
CPC .................................... *A01K 63/02* (2013.01)

(58) Field of Classification Search
CPC ...... A01K 63/02; A01K 61/70; A01C 11/003; Y02A 10/26
See application file for complete search history.

(56) References Cited

U.S. PATENT DOCUMENTS 6,080,063 A 6/2000 Khosla
8,384,542 B1 2/2013 Merrill et al.
9,317,916 B1 4/2016 Hanina et al.
9,782,668 B1 10/2017 Golden et al.
(Continued)

FOREIGN PATENT DOCUMENTS

CN 107897068 A 4/2018
JP 2017093425 A * 6/2017
(Continued)

OTHER PUBLICATIONS

Chamberland, “New Seeding Approach Reduces Costs and Time to Outplant Sexually Propagated Corals for Reef Restoration”, Dec. 22, 2017.*
(Continued)

*Primary Examiner* — Peter M Poon
*Assistant Examiner* — Hae Rie Jessica Byun
(74) *Attorney, Agent, or Firm* — Davis Wright Tremaine LLP

(57) ABSTRACT

A system for preserving or establishing an ecosystem comprises an assembly coupled to a guidance component. An assembly comprises an enclosure and a substrate, and is configured to contain one or more organisms within the enclosure. The guidance component causes the assembly to be transported to a destination environment. The assembly is decoupled from the guidance component. The assembly detaches from the substrate, to integrate the one or more organisms into an ecosystem of the destination environment.

10 Claims, 9 Drawing Sheets

(56) References Cited

U.S. PATENT DOCUMENTS

D817,195 S 5/2018 Iyengar
10,143,925 B2 12/2018 Middleton
10,192,126 B2 1/2019 Yamanaka et al.
10,279,264 B1 5/2019 Aghdaie et al.
10,579,869 B1 3/2020 Xiong et al.
10,675,536 B2 6/2020 Chen
10,839,203 B1 11/2020 Guigues et al.
10,989,815 B2 4/2021 Dmitriev et al.
11,036,303 B2 6/2021 Rani et al.
11,132,606 B2 9/2021 Taylor
11,249,179 B2 2/2022 Hamasaki et al.
11,337,358 B2 * 5/2022 Fletcher ................ B64C 39/024
2003/0142587 A1 7/2003 Zeitzew
2006/0223635 A1 10/2006 Rosenberg
2008/0170123 A1 7/2008 Albertson et al.
2008/0176583 A1 7/2008 Brachet et al.
2009/0005140 A1 1/2009 Rose et al.
2010/0156660 A1 6/2010 Lee et al.
2011/0216060 A1 9/2011 Weising et al.
2011/0298827 A1 12/2011 Perez
2011/0301934 A1 12/2011 Tardif
2012/0079990 A1 * 4/2012 Fuhr .................... A01N 1/0284 119/201
2012/0083325 A1 4/2012 Heatherly
2012/0243375 A1 9/2012 Melvin, II et al.
2012/0281181 A1 11/2012 Chen et al.
2013/0077820 A1 3/2013 Marais et al.
2013/0261856 A1 10/2013 Sharma et al.
2014/0032034 A1 1/2014 Raptopoulos et al.
2014/0153794 A1 6/2014 Varaklis et al.
2014/0253590 A1 9/2014 Needham et al.
2014/0267008 A1 9/2014 Jain et al.
2014/0310595 A1 10/2014 Acharya et al.
2015/0177842 A1 6/2015 Rudenko
2016/0078289 A1 3/2016 Michel et al.
2016/0086349 A1 3/2016 Shotton et al.
2016/0180468 A1 6/2016 Buss et al.
2016/0243434 A1 8/2016 Yim et al.
2016/0328604 A1 11/2016 Bulzacki
2017/0144756 A1 * 5/2017 Rastgaar Aagaah ......................... B64C 39/024
2017/0148339 A1 5/2017 Van Curen et al.
2017/0168586 A1 6/2017 Sinha et al.
2017/0190051 A1 7/2017 O'Sullivan et al.
2017/0193708 A1 7/2017 Lyons et al.
2017/0208493 A1 7/2017 Masson et al.
2017/0212210 A1 7/2017 Chen et al.
2017/0227638 A1 8/2017 Nicoletti et al.
2017/0234966 A1 8/2017 Naguib et al.
2017/0280678 A1 10/2017 Jones et al.
2017/0293742 A1 10/2017 Sadeghi et al.
2017/0293824 A1 10/2017 Chen et al.
2017/0313421 A1 11/2017 Gil
2017/0344859 A1 11/2017 Mo
2017/0358144 A1 12/2017 Schwarz et al.
2018/0018861 A1 1/2018 Locke et al.
2018/0020329 A1 1/2018 Smith
2018/0024641 A1 1/2018 Mao et al.
2018/0093186 A1 4/2018 Black et al.
2018/0122043 A1 5/2018 Energin et al.
2018/0213713 A1 * 8/2018 Zito, Jr. .................. B63B 22/24
2018/0263170 A1 * 9/2018 Aghai .................. G06Q 10/063
2018/0310532 A1 * 11/2018 Hickson ................. G06Q 50/02
2018/0330810 A1 11/2018 Gamarnik et al.
2019/0000350 A1 1/2019 Narayan et al.
2019/0038222 A1 2/2019 Krimon et al.
2019/0061890 A1 * 2/2019 Fiorello ................... B63G 8/22
2019/0091582 A1 3/2019 Reiche, III et al.
2019/0124893 A1 * 5/2019 Bolen .................... A01K 61/90
2019/0217198 A1 7/2019 Clark et al.
2019/0221035 A1 7/2019 Clark et al.
2019/0294881 A1 9/2019 Polak et al.
2019/0325605 A1 10/2019 Ye et al.
2019/0383903 A1 12/2019 Chao et al.
2020/0005028 A1 1/2020 Gu
2020/0050342 A1 2/2020 Lee
2020/0055570 A1 2/2020 Brink et al.
2020/0057425 A1 2/2020 Seibert et al.
2020/0160535 A1 5/2020 Ali Akbarian et al.
2020/0234231 A1 7/2020 Stevenson et al.
2020/0238177 A1 7/2020 Black et al.
2020/0284903 A1 9/2020 Zach et al.
2020/0289922 A1 9/2020 McCoy et al.
2020/0394393 A1 12/2020 Kraft et al.

FOREIGN PATENT DOCUMENTS

KR 20170139093 A 12/2017
WO 2017132563 A1 8/2017

OTHER PUBLICATIONS

Ocean News, "Meet RangerBot, Robot Reef Protector", Sep. 4, 2018.*
International Invitation to Pay Additional Fees dated Jun. 2, 2020, in International Patent Application No. PCT/US2020/016882, filed Feb. 5, 2020, 21 pages.
International Search Report and Written Opinion dated Jul. 23, 2020, Patent Application No. PCT/US2020/016882, 19 pages.
Charles, "GPS Goes Mainsteam," NPR, Dec. 26, 2007, 7 pages.
Langley et al., "Approaches to Machine Learning," Department of Computer Science Carnegie-Mellon University, Feb. 16, 1984, 28 pages.
Kramar, V., et al., "Particularities of Visualisation of Medical and Wellness Data Through a Digitial Patient Avatar", 14th Conference of Open Innovation Association FRUCT, 2013, 12 pages.

* cited by examiner

100

DEVICES TO ASSIST ECOSYSTEM DEVELOPMENT AND PRESERVATION

CROSS-REFERENCE TO RELATED APPLICATIONS

This application claims the benefit of U.S. Provisional Patent Application No. 62/803,321, filed Feb. 8, 2019, of U.S. Provisional Patent Application No. 62/822,738, filed Mar. 22, 2019, and of U.S. Provisional Patent Application No. 62/837,666, filed Apr. 23, 2019, the disclosures of which are herein incorporated by reference in their entirety.

BACKGROUND

Increasingly, the health of aquatic environments is affected by various factors, including physical damage, the effects of pollution, overfishing, and global climate change. For example, coral reef environments are increasingly under threat. Accordingly, it would be desirable to use technology to aid in the preservation of these environments, and to create new environments in which corals and other aquatic life may thrive.

BRIEF DESCRIPTION OF THE DRAWINGS

Various techniques will be described with reference to the drawings, in which.

DETAILED DESCRIPTION

Figure 1:
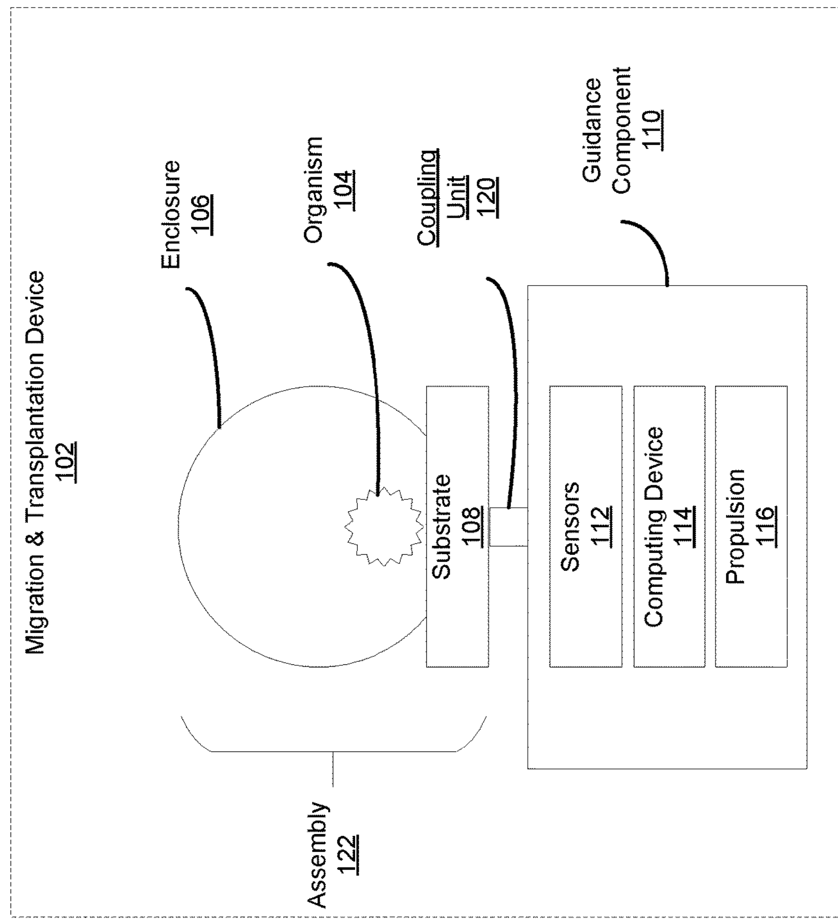
FIG. 1 illustrates an example of a migration and transplantation device, in accordance with an embodiment.

At least some techniques and systems described herein relate to devices and systems for assisting in the establishing or maintenance of an ecosystem, such as an ecosystem in an aquatic environment. For example, techniques and systems described herein may be used to facilitate the migration of organisms between different areas in an oceanic environment. These techniques and systems may be employed, for example, where there is over-population of a species in one area and under-population of the species in another area. These techniques and systems may also be employed, for example, to facilitate the migration of organisms from an aquaculture area to a destination area in the ocean, in order to address under-population of a species.

At least some techniques and systems described herein relate to the monitoring of environments, such as aquatic environments, to identify routes for transporting organisms to a destination area. In particular, the identified routes may help to avoid areas whose environmental conditions that are adverse to organisms being transported, or to find areas to transit through when those areas have environmental conditions favorable to the organisms.

At least some techniques and systems described herein relate to the monitoring of environments, such as aquatic environments, to identify environments that may be suitable for transplantation and development of a species. For example, techniques and systems described herein may be suitable for identifying aquatic environments suitable for coral growth.

At least some techniques and systems described herein relate to the maintenance of environments, particularly aquatic environments, so that the environments remain suitable for transplantation and development of a species. In at least one embodiment, capturing mechanisms help to reduce the presence of invasive species in an environment.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without necessarily including the specific details provided. Furthermore, in the description below, references to certain well-known features may be omitted or simplified to avoid obscuring the techniques being described.

Techniques described and suggested in the present disclosure improve various technological fields. For example, described herein are techniques, devices, and computer program products for facilitating the growth or maintenance of an ecosystem. For example, disclosed techniques, devices, and computer program products promote the migration and transplantation of various organisms in order to promote the health of an ecosystem.

To develop, preserve, or enhance the health of a coral reef ecosystem, certain techniques may be employed. These techniques may involve cultivating coral organisms and implanting them on substrates in a targeted environment. Such substrates might include existing reefs, sunken ships, tires, and so forth. This process might be performed manually by divers who transport the cultivated organisms from a cultivation sight and affix the organism to a pre-existing substrate. However, such manual processes in an aquatic environment can be time-consuming, dangerous, and expensive. The health of a coral reef ecosystem might therefore be improved by automated techniques.

FIG. 1 illustrates an example 100 of a migration and transplantation device, in accordance with at least one embodiment. In at least one embodiment, a migration and transplantation device 102 is usable to facilitate the development, maintenance, or improvement of an aquatic ecosystem. In at least one embodiment, a migration and transplantation device 102 is used to facilitate the development, maintenance, or improvement of a coral reef ecosystem.

In at least one embodiment, migration and transplantation device 102 is used to facilitate the migration and transplantation of an organism whose presence would benefit a target ecosystem. In at least one embodiment, the organism 104 is a coral organism, potentially including but not necessarily limited to various coral polyps, such as polyps of various soft or stony corals. Other examples might include larvae, anemones, eggs, marine spawn, and so on. Note that for simplicity in description and representation, FIG. 1 depicts a single organism. However, in various embodiments, multiple organisms may be included within the enclosure 106 or be attached to the substrate 108. For example, in some embodiments, tens, hundreds, or thousands of coral polyps might be contained within the enclosure 106. The number of such organisms within each enclosure may be based, in at least one embodiment, on the environmental needs of the organism in question, and on the ability of the device to maintain an environment compatible with those needs. Note that in at least some embodiments, the enclosure 106 is permeable in at least some respects. For example, the enclosure 106 may be permeable to one or more of light, heat, or water. As such, environmental conditions within the assembly 122 may be influenced by the surrounding environment.

In at least one embodiment, a migration and transplantation device 102 comprises a guidance component 110 and an assembly 100. An assembly 122 comprises the substrate 108, enclosure 106, and organism 104. The assembly 122 may be coupled to the guidance component 110 via a coupling unit 120. The coupling unit 120 is capable of decoupling the assembly 122 from the guidance component 110 when a decoupling function is activated.

In at least one embodiment, the guidance component 110 is configured with components for moving the device 102 from place-to-place.

In at least one embodiment, the guidance component 110 includes a battery, fuel tank, or other means of storing or generating energy for the operation of the device's components.

In at least one embodiment, the guidance component 110 comprises a propulsion component 116 suitable for aquatic movement of the device 102. In at least one embodiment, propulsion component 116 comprises a propeller. In at least one embodiment, propulsion component 116 comprises a pump-jet, impeller, or other mechanism for propulsion. The propulsion component 116 may further include one or more steering mechanisms, such as rudders, hydroplanes, ballast tanks, and so forth.

In at least one embodiment, the guidance component 110 comprises one or more sensors 112. In at least one embodiment, sensors 112 include a positioning system adapted for underwater use. In at least one embodiment, sensors 112 includes a gyroscope, depth sensor, speed sensor, compass, magnetic field sensor, microphone, or sonar sensor, individually or in various combinations.

In at least one embodiment, the guidance component 110 comprises a computing device 114, comprising a memory and at least one processor. The memory of the computing device 114 may include instructions for controlling a propulsion component 116. In at least one embodiment, the instructions for controlling propulsion component 116 include instructions for processing input from sensors 112 to determine a position and course of movement. The computing device 114 may therefore perform navigation by assessing position based on input from the sensors 112, and controlling movement via the propulsion component 116.

In at least one embodiment, the guidance component 110 is configured to follow a pre-set path. The sensors 112 and computing device 114 facilitate the movement by receiving and processing sensor data, such as GPS data transmitted in a manner suitable for the underwater environment, and applying the processed data to guide the propulsion component 116.

In embodiments, the guidance component 110 is configured to be adaptive to various environmental conditions. In at least one embodiment, the instructions stored by the memory of the computing device 114 include instructions for responding or adapting to information concerning environmental conditions. In at least one embodiment, the environmental conditions include one or more of temperature, pressure, salinity, or light intensity. In at least one embodiment, the adaptation comprises navigating around areas whose conditions might be dangerous to the organism 104. In at least one embodiment, the adaptation comprises seeking to navigate through areas whose conditions are favorable to the organism 104.

In at least one embodiment, the organism 104 is affixed to a substrate 108. Some organisms may require affixation to the substrate 108, while others will not tolerate it. Generally, the needs and health of the organism will indicate the approach to be used.

In at least one embodiment, an enclosure 106 is attached to the substrate 108 and encloses the organism 104, to restrict the organism's movement. In at least one embodiment, the enclosure 106 protects the organism from predators. In at least one embodiment, the enclosure 106 helps to maintain environmental conditions, such as temperature, pressure, or salinity, to which the organism 104 is suited.

In at least one embodiment, the enclosure 106 is permeable or semi-permeable. In some but not all cases, permeability or semi-permeability is beneficial in that it may help to prevent sudden changes in temperature, pressure, or salinity.

In at least one embodiment, the enclosure 106 is translucent or transparent. In some but not all cases, some amount of light should reach the organism 104 during migration. The enclosure 106 may be configured such that its translucency or transparency is adapted to provide an amount of light appropriate to the organism 104. In at least one embodiment, the translucency of the enclosure 104 is variable, in order to account for variations in lighting at different depths or weather conditions, or to account for changes in the organism's needs.

In at least one embodiment, the enclosure 106 is biodegradable.

In at least one embodiment, the interior of the enclosure 106 comprises nutrients for the organism 104. The nutrients may include chemicals or other organisms.

In at least one embodiment, waste products of the organism 104 are mechanically removed from the enclosure via a pump, filter, or other mechanism. In at least one embodiment, waste products are dispersed through a permeable or semi-permeable enclosure.

In at least one embodiment, the migration and transplantation device 102 includes additional sensors, not illustrated, for monitoring conditions within the enclosure. The monitored conditions may include temperature, pressure, salinity, lighting, and so forth.

In at least one embodiment, the migration and transplantation device 102 comprises mechanisms for circulation and filtration of water within the enclosure 106. In at least one embodiment, these may be controlled by the computing device 114, or by a computing device independent of the guidance component 110.

In at least one embodiment, the migration and transplantation device 102 comprises a coupling unit 120 for coupling and decoupling guidance component 110 from the assembly 122, comprising substrate 108, enclosure 106, and organism 104. The coupling unit 120 may comprise latches, clasps, grippers, bolts, cords, chains, magnets, actuators, motors, and so forth, individually or in various combinations. The coupling unit 120 may also serve as an attachment mechanism until separation of the guidance component 110 and the enclosure and substrate assembly.

In at least one embodiment, the computing device 114 triggers the coupling unit when the device 102 has navigated to the target ecosystem. In at least one embodiment, the computing device 114 determines that navigation to the target ecosystem has completed, and that the separation should occur. The coupling unit 120 then performs a decoupling function to separate the guidance component 110 from the assembly 122.

Figure 3:
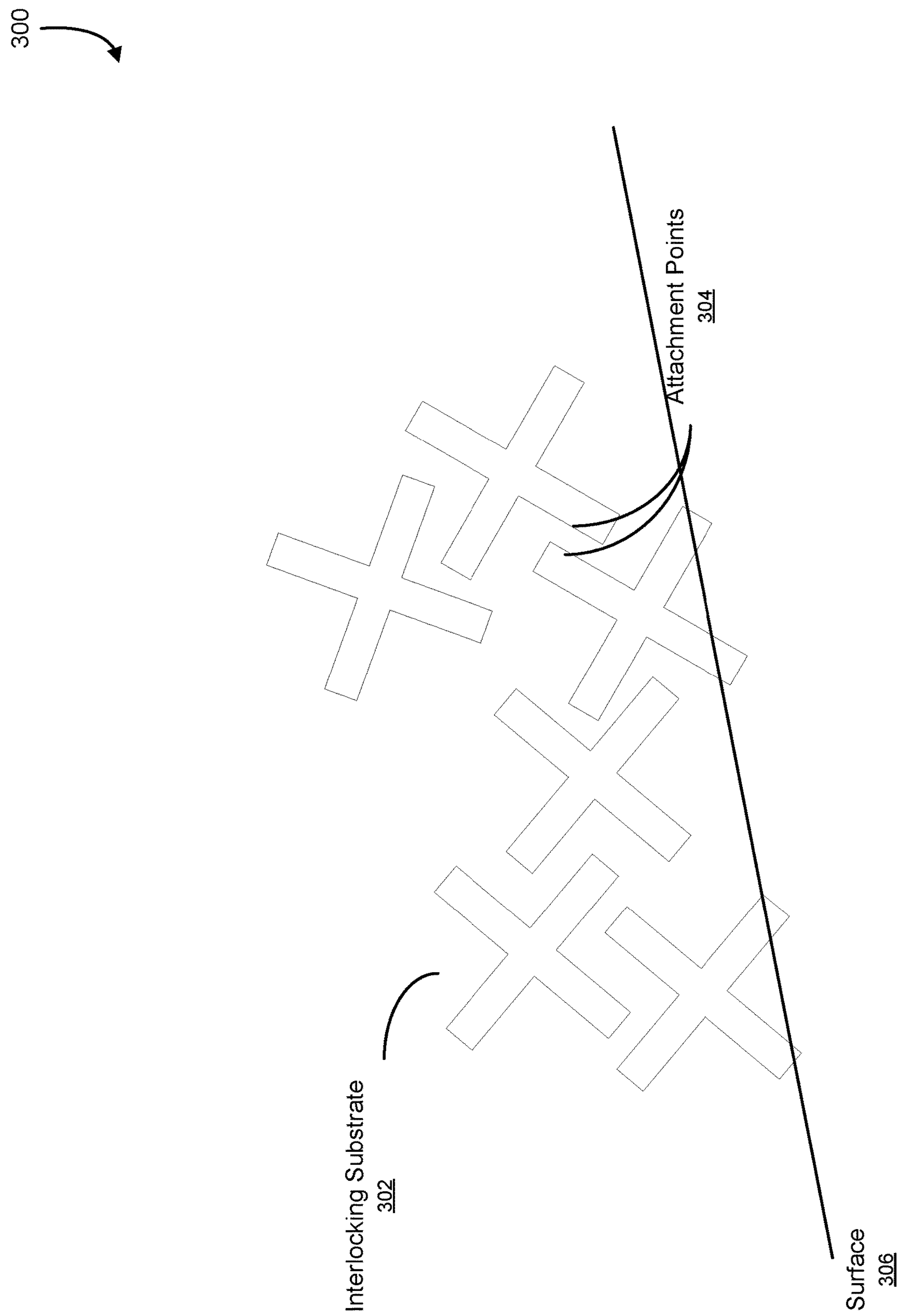
FIG. 3 illustrates formation of a superstructure comprising interlocking substrates, in accordance with an embodiment.

In at least one embodiment, separation of the assembly 122 from the guidance component 110 causes the assembly 122, including substrate 108 and enclosure 106, to be deposited into the target ecosystem. In at least one embodiment, the assembly 122 sinks and is deposited onto a surface within the ecosystem. Buoyancy of the assembly 122 may be configured such that the assembly 122 sinks to an appropriate depth, at an appropriate rate. The surface onto which the assembly 122 is deposited may be naturally occurring, such as a sea-floor or existing coral reef, or may be an artificial surface. In at least one embodiment, the substrate 108 may be shaped so as to promote the formation of a superstructure, comprised of substrates, suitable for the growth of a reef. An example of this is illustrated by FIG. 3.

In at least one embodiment, guidance component 110 is configured to navigate to another location after separation from the assembly. In at least one embodiment, guidance component 110 is configured to navigate to its starting point. In at least one embodiment, guidance component 110 surfaces after separation from the assembly. In at least one embodiment, guidance component 110 includes a compressed air tank and ballast tank to control buoyancy. In at least one embodiment, the guidance component and assembly, when combined, have neutral or negative buoyancy. Further, the guidance component 110, without the assembly, may be configured to have positive buoyancy, so that it naturally surfaces following separation.

In at least one embodiment, the guidance component and assembly are configured to have relative densities or buoyancy such that the assembly can be dropped onto a surface without impediment. For example, although FIG. 1 depicts the assembly as being on top of the guidance component 110, embodiments may be configured such that the guidance component 110 floats on top of the assembly 122.

Figure 2:
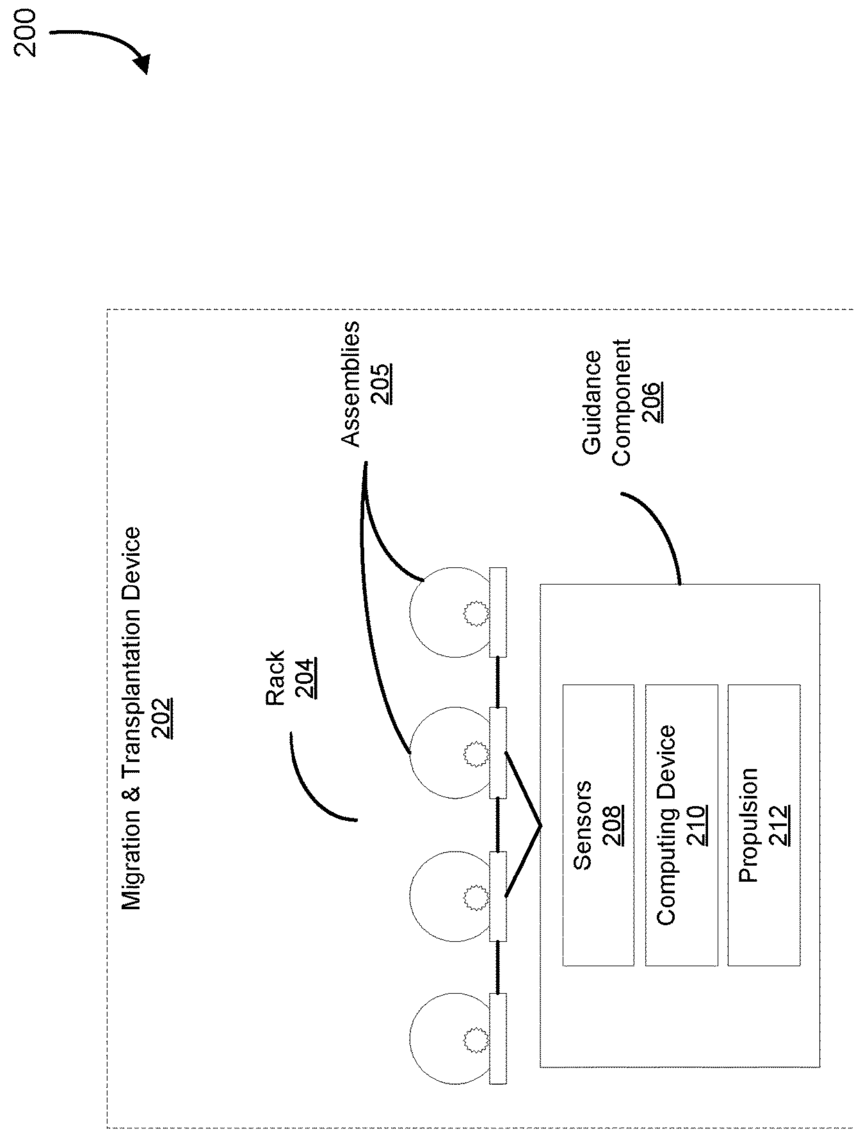
FIG. 2 illustrates a further example of a migration and transplantation device, in accordance with an embodiment.

FIG. 2 illustrates a further example of a migration and transplantation device, in accordance with an embodiment. In the example 200 of FIG. 2, a migration and transplantation device 202 comprises a rack 204 of assemblies 205, each comprising one or more organisms, an enclosure, and a substrate. The rack 204 is coupled to a guidance component 206. The guidance component 206 may function similarly to the guidance component depicted in FIG. 1, and may comprise sensors 208, a computing device 210, and a propulsion unit 212, each performing a function similar or identical to corresponding components depicted in FIG. 1.

In at least one embodiment, the rack 204 comprises a plurality of enclosure and substrate assemblies, to include a plurality of organisms. The organisms, enclosures, and substrates may correspond to those depicted in FIG. 1.

In at least one embodiment, the rack 204 is configured such that, upon release, the individual assemblies separate from the rack and each other prior to being deposited within the target ecosystem. In at least one embodiment, the substrates are configured such that, when deposited, they interlock to form a suitable superstructure for reef development. Aspects of an example of this configuration are depicted in FIG. 3.

FIG. 3 illustrates formation of a superstructure comprising interlocking substrates, in accordance with an embodiment. The devices of FIGS. 1 and 2 function to relocate organisms to a destination environment. In some cases, such as with coral reefs, the organisms should be placed at the destination onto a fixed surface. One way to facilitate this process is using the interlocking substrate mechanism depicted in FIG. 3, to form a superstructure 300 comprising substrates 302.

In at least one embodiment, the substrates depicted in FIG. 1 or 2 correspond to the interlocking-substrates 302 that are depicted in FIG. 3. In at least one embodiment, the shape of the substrates 302 is such that they form a stable superstructure when deposited on top of one another. Further, the shape may be configured such that this superstructure can be formed, in an aquatic environment, by dropping the superstructures from above a seabed or other surface on which the substrates 302 may be deposited.

In at least one embodiment, the substrates are shaped as a cross or plus-sign shape, to encourage the substrates interlock on placement. In at least one embodiment, the shapes comprise various protuberances, such as protuberances extending for some distance along each axis of in a three-dimensional space, in positive and negative directions. A wide variety of shapes may be employed. The shape, size, weight, or other characteristics of the substrates may be selected so that a pile of such shapes has, as a superstructure, sufficient stability to within a target environment. For example, the properties of the substrate may be such that a conglomeration of substrates is stable in view of the weather or oceanic currents expected to prevail in a target environment. Here, stability may refer to the substructure being able to withstand such conditions, without movements of a magnitude that would disrupt the growth of organisms living on the superstructure.

In at least one embodiment, interlocking of the substrates 302 is facilitated by the inclusion of attachment points 304. In at least one embodiment, attachment points 304 function to attract portions of respective substrates together, such that effective interlocking occurs. This may be done by a variety of means, such as hooks or barbs, hook-and-loop fasteners adapted to an aquatic environment, magnets, and so on.

In at least one embodiment, an interlocking subject comprises one or more magnets placed at a desired location, e.g., at an attachment point 304, on the respective substrate.

In at least one embodiment, an attachment point 304 has a surface texture that promotes interlocking, such as an etched or grooved surface.

In at least one embodiment, an attachment point 304 includes hooks, barbs, or other shapes designed to promote interlocking.

In at least one embodiment, the weight or density distribution of a substrate 302 is such that it sinks at an orientation that promotes interlocking. In at least one embodiment, a variety of such weight or density distributions are used, so that substrates will be deposited onto a surface 306 in a variety of orientations, further promoting interlocking between the substrates.

In at least one embodiment, a substrate comprises a propulsion unit, separate from the guidance components depicted in FIGS. 1 and 2, to help move the substrate into an interlocking position.

Figure 4:
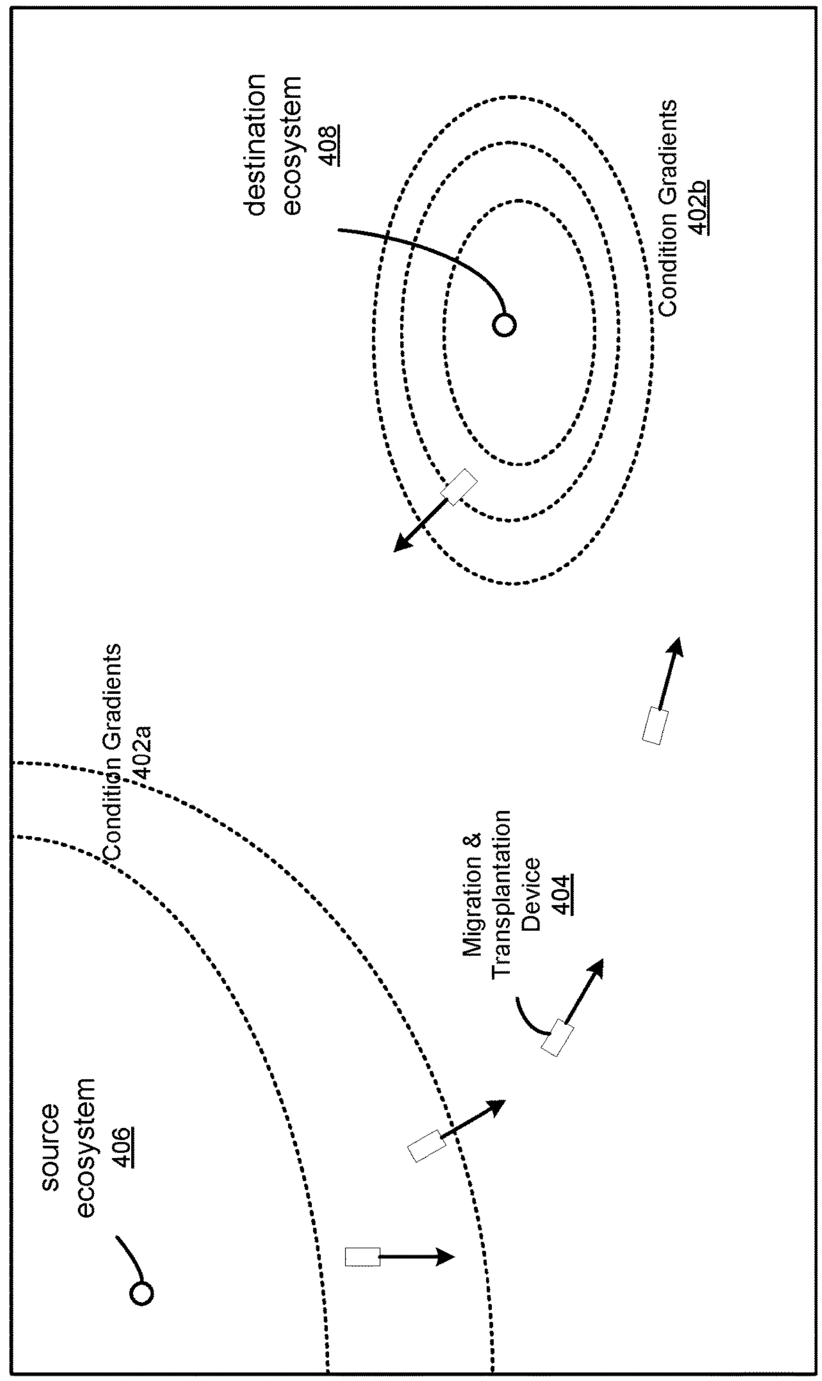
FIG. 4 illustrates aspects of a of a migration and transplantation system, in accordance with an embodiment.

FIG. 4 illustrates an example 400 of aspects of a of a migration and transplantation system, in accordance with an embodiment. In at least one embodiment, a migration and transplantation device 404 comprises sensors to obtain information about the environment through which the migration and transplantation device 404 is travelling. In at least one embodiment, these sensors include those for temperature, salinity, pressure, lighting, and ocean current. In at least one embodiment, the sensor configuration of a migration and transplantation device 404 is based, at least in part, on environmental conditions important to the relevant species. For example, environmental conditions that are important for coral polyps may include light intensity & spectrum, salinity, and temperature. An embodiment adapted to facilitate migration and transplantation of coral polyps might therefore be configured with sensors such as a photometer and spectrometer for measuring light intensity and spectrum, a conductivity sensor for estimating salinity, and a thermometer for measuring temperature. It will be appreciated that these examples are intended to be illustrative, and that as such, should not be construed in a manner which would limit the scope of the present disclosure to only those embodiments which employ the specific example, or combination of examples, provided.

In at least one embodiment, a device 404 moves between a source ecosystem 406 and a destination ecosystem 408. The source ecosystem 406, in at least one embodiment, is an aquaculture location. The destination ecosystem 408, in at least one embodiment, is an ecosystem that may benefit from the migration and transplantation of an organism obtained from the source ecosystem 406. In at least one embodiment, multiple instances of the device 404 move between the source and target ecosystems 406, 408.

In at least one embodiment, the migration and transplantation device 404, or multiple such devices, collect sensor data as they move between the source and target ecosystems 406, 408. As they move, the devices may encounter various changes in environmental conditions. These changes are represented in FIG. 4 as condition gradients 402*a,b*. Examples of condition gradient may include gradients of temperature, pressure, lighting, salinity, and so forth.

In at least one embodiment, as the instances of the device 404 move on their respective routes, the devices collect data. In at least one embodiment, instances of the device 404 share data. This may be problematic due to the difficulties of transmitting information in an aquatic environment, but a variety of techniques, as described herein, may be employed to address this issue.

In at least one embodiment, data is shared between instances of device 404 via mesh networking technologies. In at least one embodiment, the mesh network is activated when devices are in proximity to each other, and when the environment is conducive to data exchange. In at least one embodiment, instances of the device 404 surface while at source ecosystem 406 in order to join the mesh network and share data.

In at least one embodiment, a wireless network type, other than a mesh network, is used in a manner similar to what was just described in relation to a mesh network.

In at least one embodiment, one or more rendezvous points are used to encourage data sharing. For example, a route to or from a destination area may include additional points to which a device will navigate during its journeys. Upon arrival at one of these points, a device may attempt to exchange information with any other devices that are near or in the area.

In at least one embodiment, a migration and transplantation device 404 determines its route based on information concerning the condition gradients 402. The gradient information may be obtained via the mesh or wireless communication techniques just described. In at least one embodiment, routes with environmental conditions unsuited to the relevant organism are avoided. In at least one embodiment, routes with environmental conditions well-suited to the organism are favored. In at least one embodiment, routes with sudden changes to a condition gradient are avoided, and routes with gradual changes preferred. In at least one embodiment, a route is calculated so that it follows a condition gradient suitable for the organism, in order to encourage the health of the organism during transport to a destination area.

In at least one embodiment, data collected by instances of the device 404 is used to identify a destination ecosystem 408, or to identify a particular point within a target ecosystem 408, that has conditions favorable to the relevant organism. For example, while travelling to a destination ecosystem 408, a device 404 might identify other potential sites, based on sensor readings, which appear to be more favorable for growth and development of the organism.

In at least one embodiment, a group consensus decision is made to target an alternative location, so that some plurality of devices will subsequently deposit organisms at the newly selected site. In at least one embodiment, this is done so that a sufficient number of organisms will be deposited at a given location. This decision might be made, for example, when some number of devices, sufficient for a predefined quorum amount, are connected to a mesh network.

The devices and techniques of FIGS. 1-4 may also be used to assist organism lifecycles at a particular location. For example, coral organisms have a symbiotic relationship with algae. The devices may be used to capture and maintain the algae during periods in which algae are being expunged from the coral, and to release the algae into the environment when conditions are such that the coral may reincorporate the algae. Likewise, the devices may be used to supply nutrients to areas where nutrients are deficient, or to create conditions deemed optimal for a target organism's survival. For example, certain sounds are believed to attract reef larvae. The devices may include speakers and audio playback capabilities in order to recreate these sounds.

Figure 5:
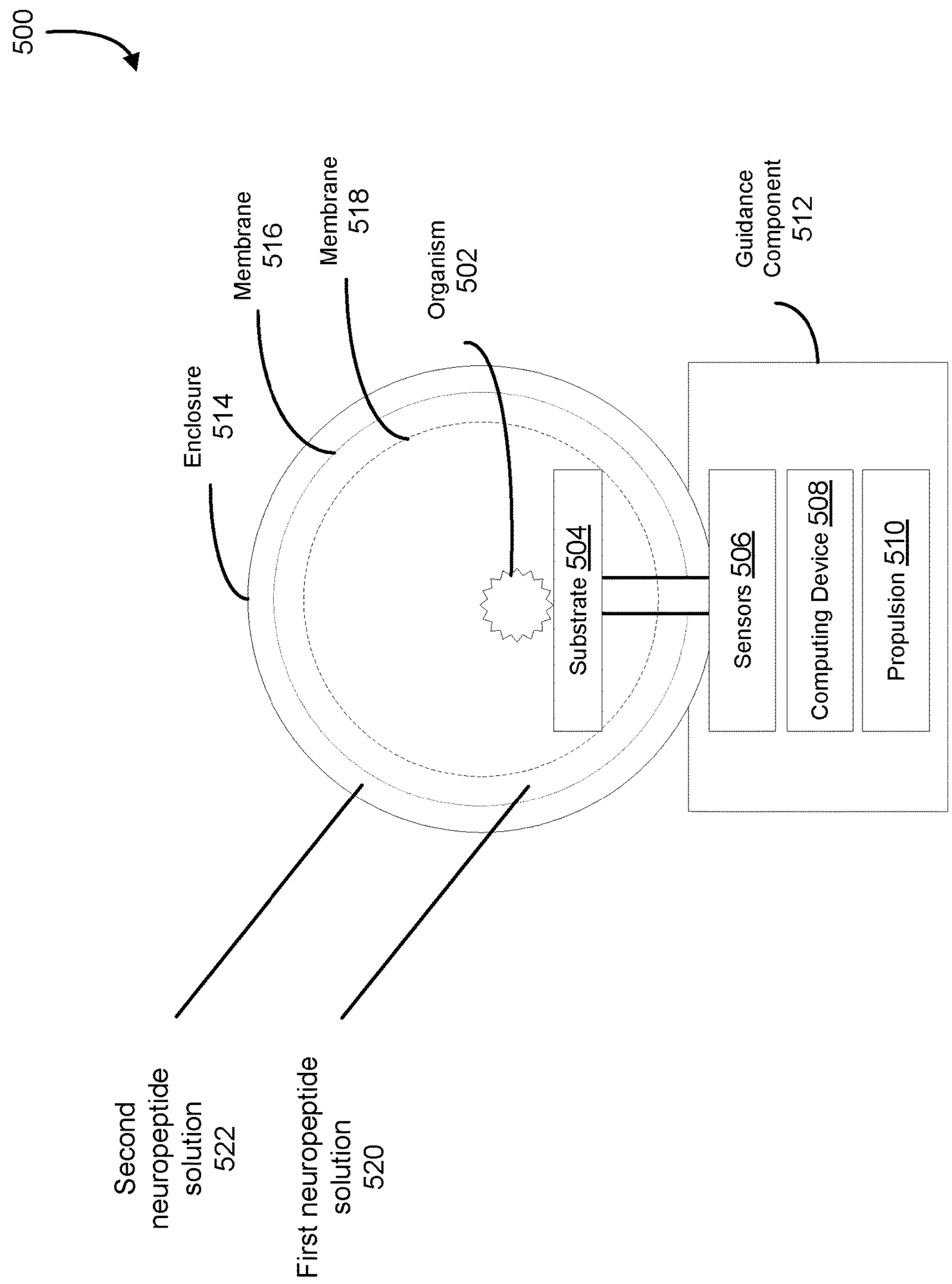
FIG. 5 illustrates an example of a migration and transplantation device, for promoting growth or health of an underwater organism.

FIG. 5 illustrates an example of a migration and transplantation device, for promoting growth or health of an underwater organism, in accordance with an embodiment. In some cases, the growth or health of an organism is promoted by exposing the organism to chemicals, nutrients, or conditions suitable to promote such growth or health. In some cases, these needs may evolve over time.

In one example, the needs of an organism evolve over a period of time in which the organism is encased in an enclosure 514. In another example, the needs of an organism evolve over a period of time in which the organism is transported from a source ecosystem to a destination ecosystem. In yet another example, the needs of an organism change over a period of time after an enclosure and substrate assembly has been deposited in a destination ecosystem, but before the enclosure 514 ceases to enclose the organism 502.

As depicted in FIG. 5, a migration and transplantation device 500 can comprise a guidance component 512, with associated sensors 506, computing device 508, and propulsion 510. The structure, purpose, and function of these devices may be similar, in at least one embodiment, to the structure, purpose, and function of corresponding components depicted in FIGS. 1 and 2.

In at least one embodiment, the migration and transplantation device 500 comprises an enclosure 514, within which an organism 502 is contained. The organism 502 may be affixed to a substrate 504, if appropriate to the type of organism. The enclosure 514 and substrate 504 may have structure, purpose, and function similar to that of the structure, purpose, and function of corresponding components depicted in FIGS. 1 and 2.

In at least one embodiment, one or more membranes 516, 518 separate layers of a chemical solution, e.g. a nutrient solution, or other liquid solution. In at least one embodiment, the membranes 516, 518 separate layers of neuropeptide solutions 520, 522 of different compositions. Note that although FIG. 5 is generally explained with reference to various neuropeptide solutions, solution types other than neuropeptides may be used, as appropriate to the type and lifecycle stage of organism 502.

The membranes 516, 518 may be degradable membranes that, over time, dissolve to allow the neuropeptides in solution to permeate the environment of the organism 502. The membranes 516, 518 may be configured so as to dissolve at different times, so that the neuropeptides can be delivered to the organism 502 in the appropriate sequence. Thus, an inner membrane 518 may dissolve or become permeable prior to an outer membrane 516 dissolving or becoming permeable, resulting in the first neuropeptide solution 520 being released to the organism's environment prior to the second neuropeptide solution 522 being released.

In an embodiment, the organism 502 is transported while being exposed, in sequence, to the neuropeptide sequence. This is accomplished by the membranes 516, 518 dissolving in a predetermined order. By delivering the neuropeptides in sequence, the growth of the organism while in transport is facilitated, and the settlement of the organism 502, when delivered to the target ecosystem, is encouraged.

In embodiments, the enclosure 514, membranes 516, 518, and substrate 504 are provided independently of, and do not comprise, a guidance component 512. Other means of delivering the assembly, comprising enclosure 514, membranes 516, 518, and substrate 504, may be used.

In embodiments, the enclosure 514 is also degradable, and will dissolve in sequence with the other membranes 516, 518. By dissolving in sequence, each layer can deliver a separate trigger or inducer for a lifecycle change in the enclosed organism. When the enclosure 514 dissolves, the organism 502 can be directly exposed to the environment of the destination ecosystem.

In at least one embodiment, the membranes may be made to dissolve or may be made permeable in response to a noted change in environmental conditions, or upon some other event, such as arrival at a destination ecosystem. Various approaches may be used, such as the application of a mild electric current to the membrane to be dissolved, or the release of an enzyme that, while otherwise harmless, triggers the appropriate membrane to dissolve.

Another problem that may arise when promoting the development, growth, or maintenance of an ecosystem is the effect of invasive species, or other species which may interfere in the appropriate development of an ecosystem. One such example is the lionfish, which can interfere with the health of a coral reef due to the lionfish species lack of native predators and voracious appetite.

Figure 6:
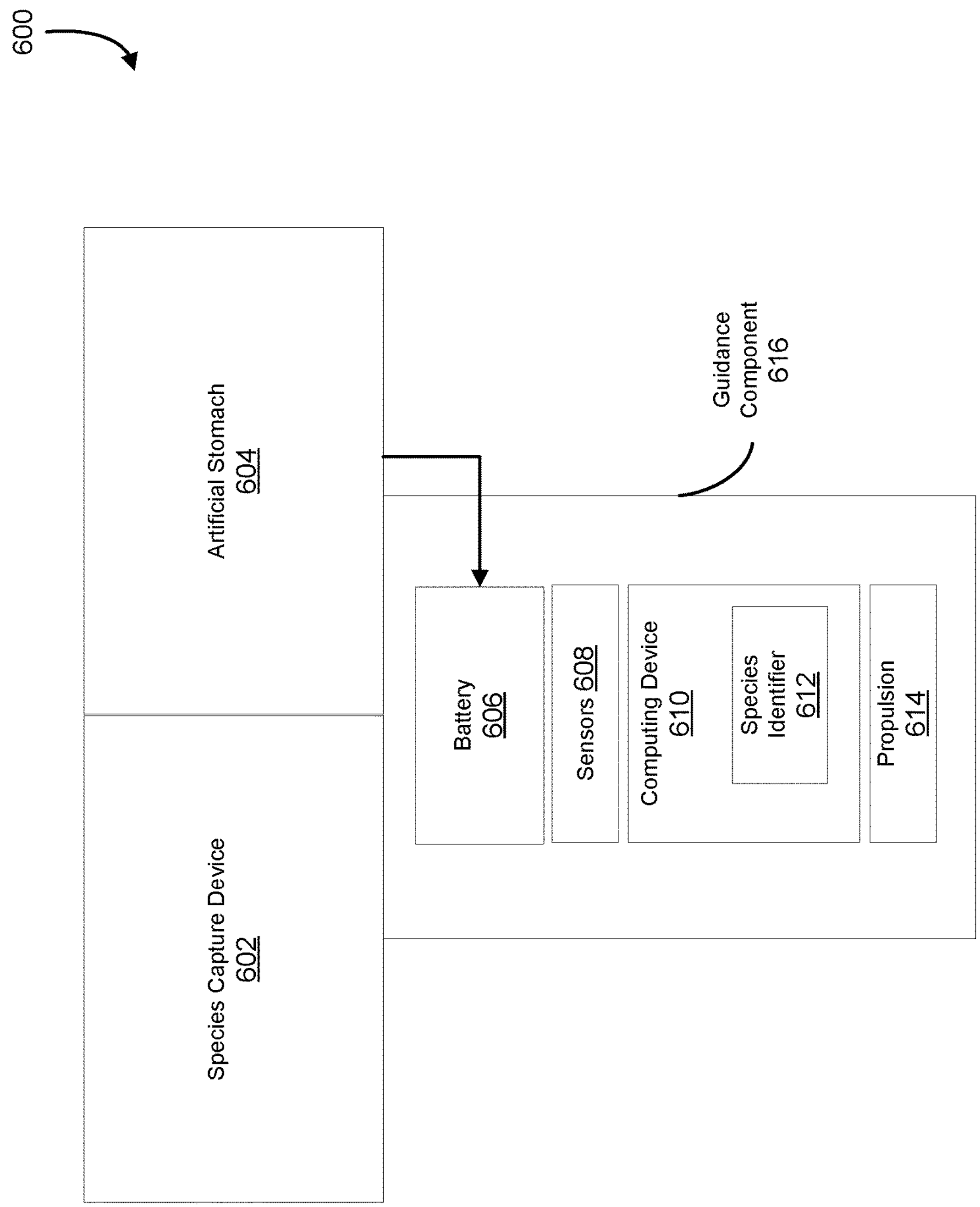
FIG. 6 illustrates a system for responding to an invasive underwater species.

FIG. 6 illustrates a system for responding to an invasive underwater species. The invasive species countermeasure device 600 may comprise a guidance component 616, which may be similar to the guidance components depicted in FIGS. 1, 2, and 5, but adapted for the invasive species countermeasures described herein. The guidance component 616 may comprise sensors 608, computing device 610, and propulsion component 614, which may be similar to the corresponding components depicted in FIGS. 1, 2, and 5.

In at least one embodiment, the guidance component 616 further comprises a battery 606 for storing energy.

In at least one embodiment, the guidance component 616 comprises a species identifier module 612. The species identifier module 612 may comprise a machine-learning model trained to identify a particular invasive species, such as a lionfish, zebra mussel, green crab, and so forth.

In at least one embodiment, the species identifier module 612 interacts with other modules of the computing device 610, to cause the propulsion component 614 to navigate towards a specimen of an invasive species observed in the environment.

In at least one embodiment, the invasive species countermeasure device 600 comprises a species capture device 602 which enables the system to capture an observed specimen of the invasive species. In some cases, the species capture device 602 may be configured to perform an entrapping motion. In other cases, the species capture device 602 comprises a lure or bait to draw the specimen into the device 600. The species capture device 602 may comprise an enclosure suitable to contain the specimen, until the specimen can be transferred to the artificial stomach 604.

The invasive species countermeasure device 600 transfers a captured species into the artificial stomach 604. There, biological and/or biochemical processes cause the specimen to be digested, such that a byproduct of the digestion is that electricity is generated and stored in the battery 606. This process may extend the operating time or operating range of the device 600, enabling greater efficiency in responding to invasive species.

In at least one embodiment, an invasive species countermeasure device 600 is combined with a migration and transplantation device, such as the devices depicted in FIGS. 1, 2, and 5. In at least one embodiment, a combined device captures an organism or organisms, and determines to transplant or digest the organism based on identification of the corresponding species by a species identifier module 612. In at least one embodiment, a combined device performs a migration and transplantation task, and then converts to performing invasive species reduction. In at least one embodiment, combined devices communicate to allocate some percentage of a group of such devices to migration and transplantation, and some other percentage to invasive species reduction.

In at least one embodiment, the invasive species countermeasure device 600 collects data concerning the prevalence of an invasive species at various points along its navigation path, or at its destination area, and shares the data with other devices. Techniques for sharing information with other devices in an aquatic environment are described herein. By sharing this information, target locations for other devices can be determined. For example, in at least one embodiment, devices may exchange information concerning where invasive species have been spotted, and arrive at a consensus decision regarding what locations should be designated as destination areas for invasive species capture.

Figure 7:
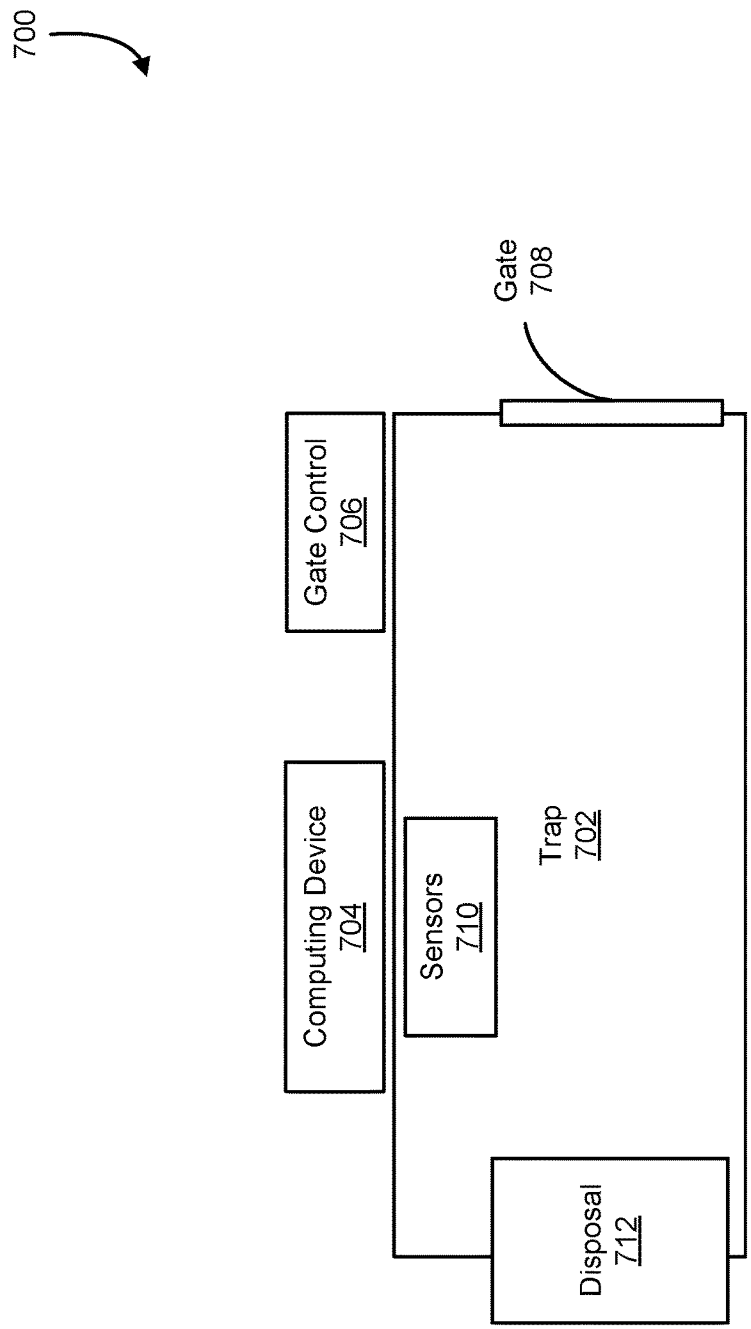
FIG. 7 illustrates an example device for controlling invasive species, in accordance with an embodiment.

Another approach to dealing with invasive species is using stationary devices. FIG. 7 illustrates an example device for controlling invasive species, in accordance with an embodiment. In the example 700 of FIG. 7, a stationary trap 702 is configured to reduce the impact of invasive species on a target ecosystem, and to thereby promote the development, maintenance, or improvement of the target ecosystem.

In an embodiment, the trap 702 comprises a gate 708 which is mechanically operated by a gate control 706. The gate control 706 may comprise a mechanical device for opening and closing the gate 708. A computing device 704 issues commands to the gate control 706 regarding when the gate should be opened and when it should be closed.

The trap 702 may be placed in a location where one or more species may enter the trap 702 while the gate 708 is open. The visitors to the trap may include non-invasive species as well as an invasive species.

Sensors 710 collect visual and other data to collect input to a classifier, such as an artificial neural network, that is implemented on the computing device 704. The classifier may operate similarly to the invasive species identifier depicted in FIG. 6.

In at least one embodiment, the classifier is trained to classify occupants of the trap 702 as invasive or non-invasive. This may be done, for example, by training the classifier to specifically recognize a particular invasive species, such as a lionfish. A creature not classified as a particular, invasive, species may be classified as non-invasive.

In at least one embodiment, the computing device 704 determines that an invasive species is within the trap 702, and in response issues a command to the gate control 706 to cause the gate 708 to close.

In at least one embodiment, the command to close the gate is issued when a creature of a not-yet-classified species has entered the trap. The sensors 710 then collect information, such as visual data, and the information is provided to the classifier operative on the computing device 704. The classifier then outputs a determination as to whether or not the creature that entered the trap is an example of an invasive species. If so, the gate remains closed and the disposal unit 712 is operated to dispose of the creature. However, if the creature is determined to not be an invasive species, the gate 708 is opened and the creature leaves or is safely expelled from the trap 702.

Alternatively, the computing device 704 issues the command to close the gate only when an invasive species has entered the trap 702 and has been recognized as an example of an invasive species. Otherwise, the gate 708 remains open until the creature departs, or is expelled.

In an embodiment, the disposal 712 is a mechanical device actuated by the computing device 702. The disposal 712 operates to humanely kill and dispose of the remains of the invasive species. A variety of mechanisms, as appropriate to the targeted species, may be employed.

In an embodiment, the disposal 712 comprises a turbine to create a water current in the trap 702. For example, when an invasive species has been trapped, the disposal 712 may create a suction effect pulling the creature into the disposal. When a non-invasive species has been trapped, the disposal 712 may reverse the direction of the current, so that it flows towards the gate 708, in order to safely expel the creature.

Figure 8:
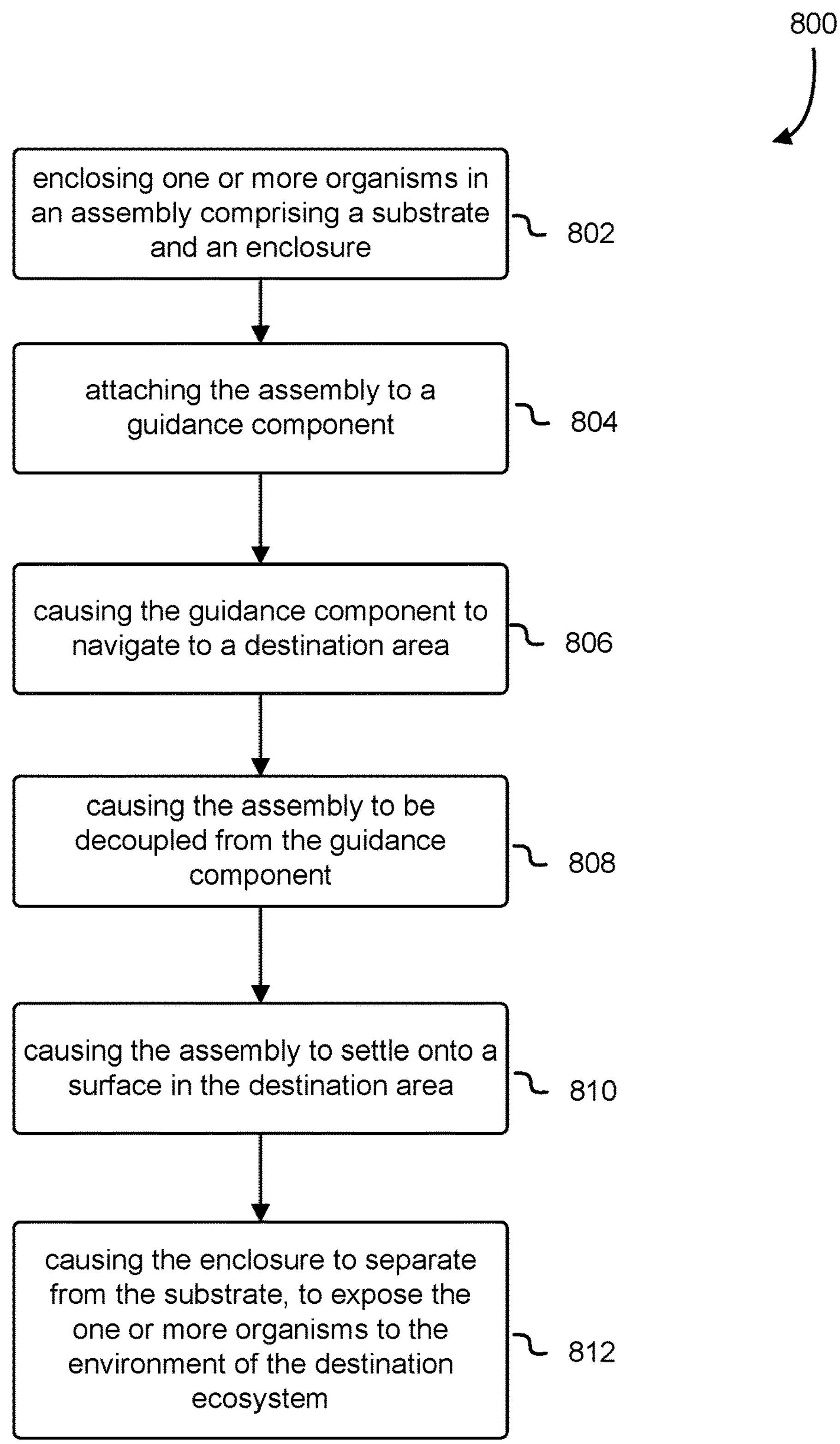
FIG. 8 illustrates an example process for preserving or enhancing species population in an ecosystem, in accordance with an embodiment.

FIG. 8 illustrates an example process 800 for preserving or enhancing species population in an ecosystem, in accordance with an embodiment. Although FIG. 8 is depicted as a sequence of steps, the depicted sequence should not be construed in a manner which would limit the scope of embodiments to only those embodiments that conform to the depicted sequence. In particular, except where logically required, such as when the input to one step comprises output from a prior step, embodiments may perform at least some of the depicted steps in an order differing from the depicted order. In some embodiments, certain steps may be altered or omitted.

In at least one embodiment, the steps depicted in FIG. 8 are performed, except where noted, by a device similar to one of the devices depicted in FIG. 1, 2, or 5. In at least one embodiment, the steps of FIG. 8 are performed, except where noted, by a device which combines an assembly, such as any of those depicted in FIG. 1, 2, or 5, with the species capture device 602 depicted in FIG. 6.

At 802, one or more organisms are enclosed in an assembly comprising a substrate and an enclosure. Examples of assemblies and enclosures are described herein, for example in relation to FIGS. 1, 2, and 5.

In at least one embodiment, the one or more organisms are obtained from an aquaculture location, or from an aquatic environment in which harvesting of the one or more organisms is sustainable.

In at least one embodiment, the one or more organisms are affixed to the substrate, and the enclosure is then affixed to the substrate so that it surrounds and contains the one or more organisms. In at least one embodiment, the one or more organisms are affixed through a natural process, e.g., by the organisms attaching themselves to the substrate through a natural process.

In at least one embodiment, the one or more organisms are injected into the substrate. The enclosure may comprise a valve or other mechanisms suitable for such use, or may be composed of a material that permits a needle to penetrate the enclosure. Once inside the enclosure, the one or more organisms may affix themselves to the substrate via a natural process.

At 804, the assembly is attached to a guidance component. In at least one embodiment, the guidance component navigates to an area, such as an aquaculture area or other location, where assemblies are produced, and is then coupled to the guidance component. In at least one embodiment, the guidance component comprises logic and mechanisms for automatically attaching to an assembly. In other embodiments, the assembly is attached through a manual process.

At 806, the guidance component navigates to a destination area. As depicted in FIG. 4, the guidance component may select a route of navigation based on environmental conditions. In at least one embodiment, the guidance component determines the route based on following condition gradients that are suited to the organisms being transported.

At 808, the assembly is decoupled from the guidance component. In at least one embodiment, the guidance component determines that it has arrived at a destination area, and respond by activating a mechanism to decouple the assembly from the guidance component. In at least one embodiment, the mechanism comprises an electronically activated latch or grasping mechanism.

At 810, the assembly settles onto a surface at the destination area. The assembly may be configured to have density or buoyancy that causes the assembly to sink upon release from a guidance component. In at least one embodiment, the density or buoyancy is such that the assembly sinks at a predetermined rate, e.g., a rate that protects the organisms and the environment. For example, the density or buoyancy may be selected to limit an assembly's rate of descent to a speed that would not cause the assembly to damage a surface in the marine environment.

In at least one embodiment, the substrate interlocks with, or attaches, to a surface or object in the destination area. For example, the substrate may be similar to those depicted in FIG. 3, and may interlock with other substrates in the destination area. Alternatively, the substrate may attach to a surface in the environment itself. Note that here, attachment refers to achieving some suitable degree of resistance to displacement, rather than to literal attachment. For example, two substrates of the kind depicted in FIG. 3 may be considered attached when there protuberances prevent or at least discourage displacement of a substrate. Accordingly, the substrates may be considered attached even if they are not welded together, glued together, or otherwise bonded.

At 812, the enclosure separates from the substrate, so that the one or more organisms are exposed to the environment of the destination ecosystem. In at least one embodiment, the enclosure dissolves and thereby separates from the substrate. For example, the enclosure may be made of a material that is biodegradable or soluble in an aquatic environment. In at least one embodiment, a material for the enclosure is selected so that it dissolves or biodegrades at a rate which permits the assembly to be transferred to the destination area before the enclosure separates from the substrate.

Figure 9:
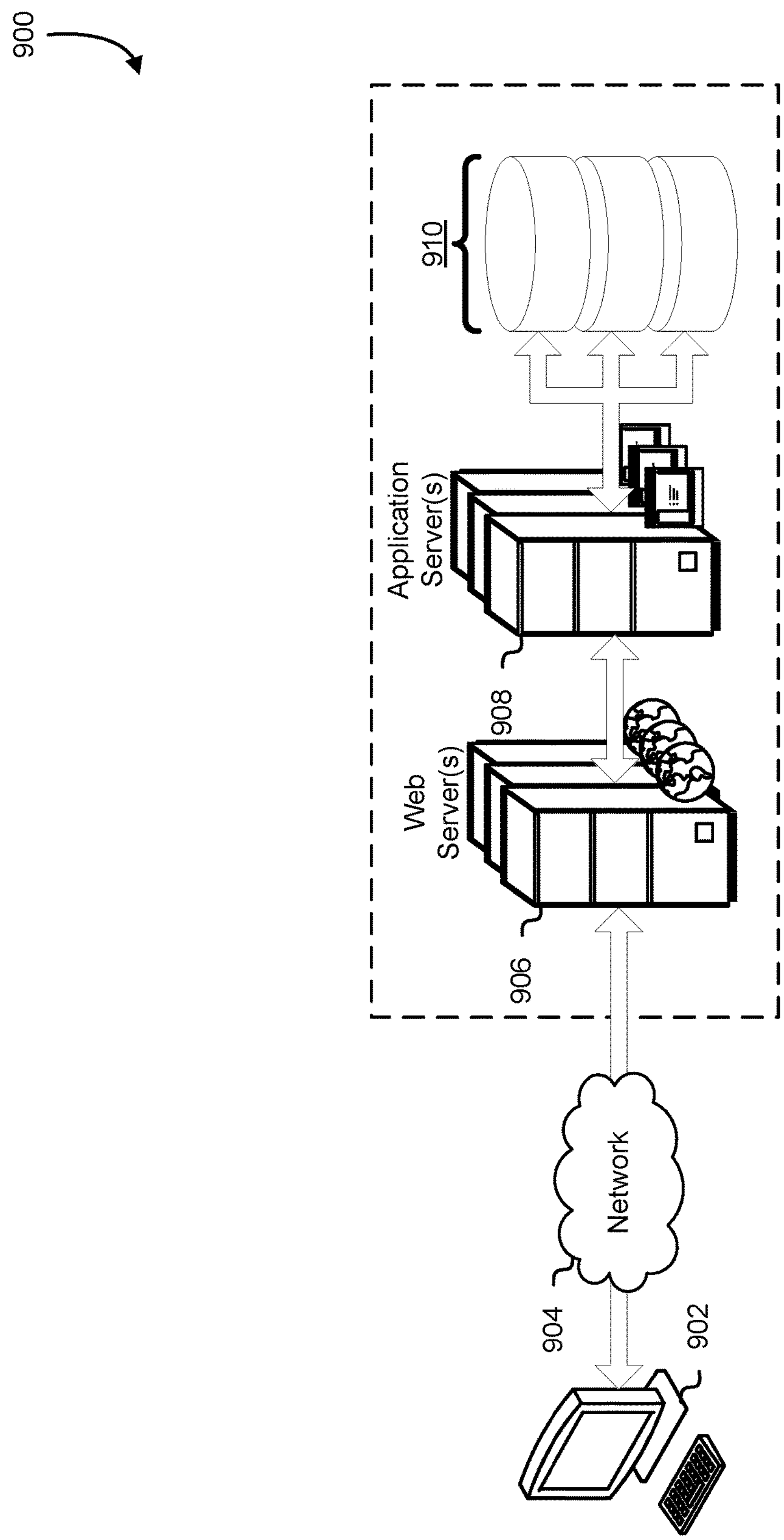
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and convey information back to a user of the device. Examples of such client devices include personal computers, cell phones, handheld messaging devices, laptop computers, tablet computers, set-top boxes, personal data assistants, embedded computer systems, electronic book readers, and the like.

The environment 900 in one embodiment is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than those illustrated in FIG. 9. Thus, the depiction in FIG. 9 should be taken as being illustrative in nature and not limiting to the scope of the disclosure.

The network 904 can include any appropriate network, including an intranet, the Internet, a cellular network, a local area network, a satellite network or any other network, and/or combination thereof. Components used for such a system can depend at least in part upon the type of network and/or environment selected. Many protocols and components for communicating via such network 904 are well known and will not be discussed in detail. Communication over the network 904 can be enabled by wired or wireless connections and combinations thereof. In an embodiment, the network 904 includes the Internet and/or other publicly-addressable communications network, as the environment 900 includes one or more web servers 906 for receiving requests and serving content in response thereto, although for other networks an alternative device serving a similar purpose could be used as would be apparent to one of ordinary skill in the art.

The illustrative environment 900 includes one or more application servers 908 and data storage 910. It should be understood that there can be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, "servers" may refer to a programming module being executed on a computer system. As used, unless otherwise stated or clear from context, the term "data store" or "data storage" refers to any device or combination of devices capable of storing, accessing, and retrieving data, which may include any combination and number of data servers, databases, data storage devices, and data storage media, in any standard, distributed, virtual, or clustered environment.

The one or more application servers 908 can include any appropriate hardware, software and firmware for integrating with the data storage 910 as needed to execute aspects of one or more applications for the electronic client device 902, handling some or all of the data access and business logic for an application. The one or more application servers 908 may provide access control services in cooperation with the data storage 910 and is able to generate content including, text, graphics, audio, video, and/or other content usable to be provided to the user, which may be served to the user by the one or more web servers 906 in the form of HyperText Markup Language (HTML), Extensible Markup Language (XML), JavaScript, Cascading Style Sheets (CSS), JavaScript Object Notation (JSON), and/or another appropriate client-side structured language. Content transferred to the electronic client device 902 may be processed by the electronic client device 902 to provide the content in one or more forms including forms that are perceptible to the user audibly, visually, and/or through other senses. The handling of all requests and responses, as well as the delivery of content between the electronic client device 902 and the one or more application servers 908, can be handled by the one or more web servers 906 using PHP: Hypertext Preprocessor (PHP), Python, Ruby, Perl, Java, HTML, XML, JSON, and/or another appropriate server-side structured language in this example. Further, operations described as being performed by a single device may, unless otherwise clear from context, be performed collectively by multiple devices, which may form a distributed and/or virtual system.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The data storage 910 can include several separate data tables, databases, data documents, dynamic data storage schemes, and/or other data storage mechanisms and media for storing data relating to a particular aspect of the present disclosure. For example, the data storage 910 may include mechanisms for storing various types of data and user information, which can be used to serve content to the electronic client device 902. The data storage 910 also is shown to include a mechanism for storing log data, such as application logs, system logs, access logs, and/or various other event logs, which can be used for reporting, analysis, or other purposes. It should be understood that there can be many other aspects that may need to be stored in the data storage 910, such as page image information and access rights information, which can be stored in any of the above listed mechanisms as appropriate or in additional mechanisms in the data storage 910. The data storage 910 is operable, through logic associated therewith, to receive instructions from the one or more application servers 908 and obtain, update, or otherwise process data in response thereto. The one or more application servers 908 may provide static, dynamic, or a combination of static and dynamic data in response to the received instructions. Dynamic data, such as data used in web logs (blogs), shopping applications, news services, and other applications may be generated by server-side structured languages as described or may be provided by a content management system (CMS) operating on, or under the control of, the one or more application servers 908.

In one embodiment, a user, through a device operated by the user, can submit a search request for a match to a particular search term. In this embodiment, the data storage 910 might access the user information to verify the identity of the user and obtain information about items of that type. The information then can be returned to the user, such as in a results listing on a web page that the user is able to view via a browser on the electronic client device 902. Information related to the particular search term can be viewed in a dedicated page or window of the browser. It should be noted, however, that embodiments of the present disclosure are not necessarily limited to the context of web pages, but may be more generally applicable to processing requests in general, where the requests are not necessarily requests for content.

The various embodiments further can be implemented in a wide variety of operating environments, which in some embodiments can include one or more user computers, computing devices, or processing devices that can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via the network 904. These devices also can include virtual devices such as virtual machines, hypervisors, and other virtual devices capable of communicating via the network 904.

Various embodiments of the present disclosure utilize the network 904 that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), and Common Internet File System (CIFS). The network 904 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering.

In embodiments utilizing the one or more web servers 906, the one or more web servers 906 can run any of a variety of server or mid-tier applications, including Hypertext Transfer Protocol (HTTP) servers, FTP servers, Common Gateway Interface (CGI) servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python, or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment 900 can include a variety of data stores and other memory and storage media as discussed above. These can reside in a variety of locations, such as on a storage medium local to (and/or resident in) one or more of the computers or remote from any or all of the computers across the network 904. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit (CPU or processor), an input device (e.g., a mouse, keyboard, controller, touch screen, or keypad), and an output device (e.g., a display device, printer, or speaker). Such a system may also include one or more storage devices, such as disk drives, optical storage devices, and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc Read-Only Memory (CD-ROM), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some embodiments, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some embodiments, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some embodiments, be single devices and, in other embodiments, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A device, comprising:

an assembly comprising an enclosure and a substrate, the assembly to contain one or more organisms, wherein the enclosure dissolves to expose the one or more organisms to an environment of a destination area;

a guidance component coupled to the assembly, wherein the guidance component comprises a propulsion device that causes aquatic movement of the device;

at least one processor; and a memory comprising instructions that, in response to execution by the at least one processor, cause the device to at least:

navigate, by the guidance component, to the destination area underwater in an aquatic environment, wherein the navigation to the destination area is based, at least in part, on avoiding environmental conditions that are adverse to the one or more organisms; and decouple the guidance component from the assembly, wherein the assembly, upon decoupling from the guidance component, is deposited in the destination area, and wherein the enclosure separates from the substrate subsequent to the decoupling.

2. The device of claim 1, wherein the assembly, subsequent to decoupling from the guidance component, sinks onto a surface in the destination area.

3. The device of claim 1, wherein the assembly comprises a membrane situated within the enclosure to separate a chemical solution from the one or more organisms.

4. The device of claim 3, wherein the membrane is configured to dissolve to release the chemical solution.

5. The device of claim 3, wherein the membrane is permeable to release the chemical solution at a predetermined rate.

6. The device of claim 1, wherein the substrate comprises protuberances to interlock with other objects in the destination area.

7. A device, comprising:

a guidance component, wherein the guidance component comprises a propulsion device that causes aquatic movement of the device;

one or more sensors;

at least one processor; and a memory comprising instructions that, in response to execution by the at least one processor, cause the device to at least:

determine a course of navigation to a destination area underwater;

collect, by the one or more sensors, environmental data associated with the course to the destination area;

share the collected environmental data with at least one of one or more additional devices;

receive environmental data from at least one of the one or more additional devices;

adjust the course of navigation to the destination area, based at least in part on at least one of the collected or received environmental data, and based at least in part on environmental parameters suitable for one or more organisms to be transported to the destination area; and release an assembly comprising an enclosure, a substrate, and the one or more organisms in response to arriving at the destination area, wherein the enclosure dissolves to expose the one or more organisms to an environment of the destination area.

8. The device of claim 7, wherein the course for navigation is adjusted to avoid environmental conditions unsuitable for the one or more organisms.

9. The device of claim 7, wherein the environmental data comprise information indicative of at least one of a presence or an absence of an invasive species.

10. The device of claim 7, wherein an invasive species capture device is coupled to the guidance component creating a combined device, wherein the combined device performs at least one of migration and transplantation of the one or more organisms or captures an observed specimen of an invasive species.

* * * * *